United States Patent [19]

Takeguchi et al.

[11] 4,320,085
[45] Mar. 16, 1982

[54] METHOD OF INHIBITING AND ELIMINATING CHLOROPHYCEAE IN WATER IN TANK

[75] Inventors: Masanobu Takeguchi; Isao Oyobe, both of Fujisawa, Japan

[73] Assignee: Marui Industry Co., Ltd., Tokyo, Japan

[21] Appl. No.: 137,270

[22] Filed: Apr. 4, 1980

[30] Foreign Application Priority Data

Apr. 10, 1979 [JP] Japan .................. 54-42472

[51] Int. Cl.³ .............................................. A61L 2/10
[52] U.S. Cl. .................................... 422/24; 250/436; 250/437
[58] Field of Search ................... 422/24; 250/435, 436, 250/437, 438

[56] References Cited

U.S. PATENT DOCUMENTS

| 2,482,507 | 9/1949 | Rentschder et al. | 422/24 X |
| 3,336,099 | 8/1967 | Czulak et al. | 250/436 X |
| 3,535,513 | 10/1970 | Arami | 422/24 X |
| 3,672,823 | 6/1972 | Boucher | 422/24 X |
| 4,204,956 | 5/1980 | Flatow | 422/24 X |

Primary Examiner—Barry Richman
Attorney, Agent, or Firm—Oblon, Fisher, Spivak, McClelland & Maier

[57] ABSTRACT

Water stored in a container is circulated through an external passageway and subjected to ultraviolet radiation, whereupon undesired aquatic chlorophyceae are eliminated by inhibiting their growth. The water is circulated at such a rate that at least half the volume of water in the container is circulated per hour.

3 Claims, 3 Drawing Figures 4,320,085

METHOD OF INHIBITING AND ELIMINATING CHLOROPHYCEAE IN WATER IN TANK

FIELD OF THE INVENTION

1. Background of the Invention

This invention relates to a method of treating water stored in a container, and more particularly, to a method in which such water is circulated through an external passageway and subjected to ultraviolet radiation in a sealed chamber provided in the passageway, whereupon the growth of undesired aquatic chlorophyceae is inhibited until the water no longer contains chlorophyceae.

2. Description of the Prior Art

When water is stored in indoor or outdoor reservoirs for a long time, nutrient salts present in a small amount serve as food for chlorophyceae which grow and adhere to the walls of the reservoir or remain suspended in water. Conventional techniques to eliminate this problem are to scrape the chlorophyceae from the walls, or coat an anti-algal paint onto the walls, or supply an algicide of low toxicity to fish to the water. However, these methods have their own problems: with the first method thorough cleaning is difficult to achieve; in the second method, a substance toxic to fish is released into water; in the third method, one algicide gives only a temporary effect, and another exhibits a lingering residual effect that is toxic to fish, or chlorophyceae that have died in a great quantity will putrefy and decrease the oxygen dissolved in water and/or emit a malodor.

3. Summary of the Invention

Therefore, one object of this invention is to provide a method of inhibiting and eliminating chlorophyceae by circulating water stored in a container through an external passageway and subjecting the circulating water to repeated irradiation with a relatively low dose of UV rays. The method is not only capable of preventing the birth of chlorophyceae but it is also capable of eliminating grown chlorophyceae. What is more, since these effects are not temporary, chlorophyceae will not die all at once to be putrefied, nor will there by any residual or additional toxic substance.

Another object of this invention is to provide an economical method of inhibiting and eliminating chlorophyceae without causing any adverse effect on animals or plants in a water tank other than chlorophyceae.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

The essential aspect of this invention is as follows: the water in a tank wherein chlorophyceae have not yet or have already come to being is introduced into a separate UV irradiation vessel where it is exposed to shortwave UV radiation before it is returned to the tank. According to this invention, the water in the tank is kept circulating through a path including the water tank and UV irradiation vessel. UV radiation, of course, has bactericidal activity, but in this invention, it is not used for that purpose but for inhibiting the birth and growth of chlorophyceae that are higher organisms than bacteria and fungi or for eliminating already grown chlorophyceae. As mentioned earlier, the method of this invention performs UV irradiation in a separate vessel rather than in the water storage tank, and it is required that both the dose of UV radiation and the water circulation rate be higher than a certain level.

In water, while new chlorophyceae are being produced (synthesis of a substance), existing chlorophyceae are exhausted, become extinct and decompose (exhaustion and decomposition of a substance). When water in a reservoir is treated, motile or immotile reproductive cells of chlorophyceae come into existence during alternate generations. Upon exposure to UV radiation, the function of such reproductive cells suspended in water is destroyed and the production of new chlorophyceae is suppressed. On the other hand, already grown chlorophyceae age and lose their vigor gradually until they die. In this manner, not only the birth and growth of chlorophyceae is inhibited but also existing ones can be eliminated by the treatment of this invention.

Figure 1:
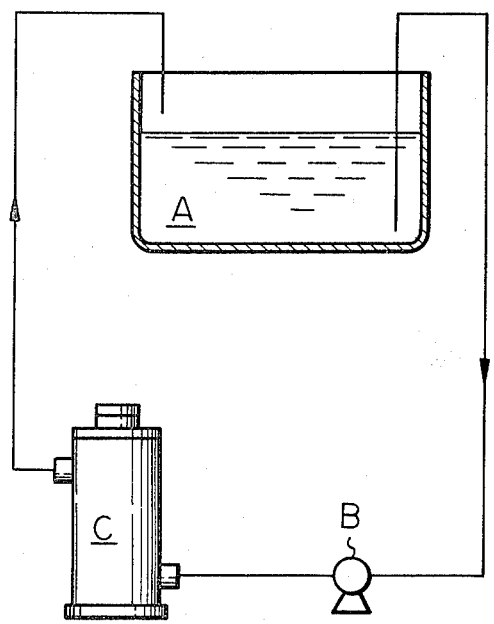
FIG. 1 is a flow diagram showing the arrangement of a water container and the irradiation vessel as used in the practice of this invention.

This invention is now described in detail by reference to a preferred embodiment. FIG. 1 is a flow diagram representing the arrangement of the apparatus used in this invention, wherein A is a water tank, B is a circulating pump and C is an UV irradiation vessel. The water in the tank A is sent by the pump B to the UV irradiation vessel C where it is exposed to UV radiation.

Figure 2:
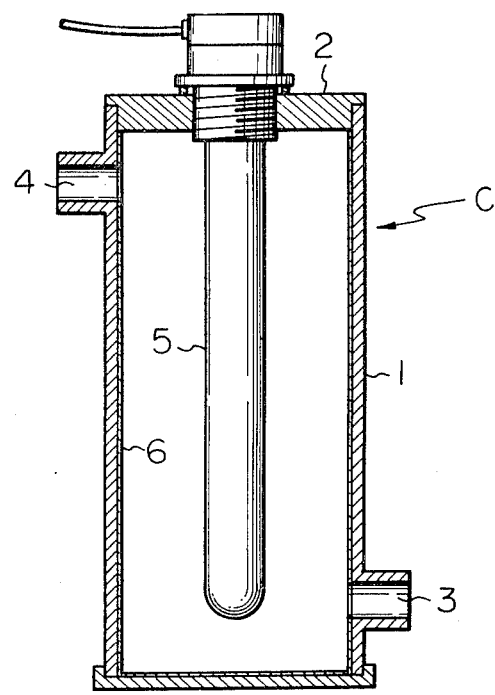
FIG. 2 is a cross section of an UV irradiation vessel to be used in this invention.

FIG. 2 is a cross section of the UV irradiation vessel C. The vessel comprises a frame 1 of synthetic resin whose top is closed airtight with a lid 2. In the lower part of the frame, an inlet 3 for water to be purified is provided, and an outlet 4 for treated water is provided in the upper part. The numeral 5 represents a waterproof, double-tubed UV lamp which is detachably installed in the center of the lid 2. The numeral 6 is a reflective plate with which the inside walls of the vessel are lined to achieve an enhanced effect of irradiation of UV rays.

When water was kept in a 50-liter glass tank for about three months, chlorophyceae grew in the water and turned it green, and dense algal growths were deposited on the inner surfaces of the walls, making it difficult to look through the tank. When the method of this invention was applied to such water, the following results were obtained. The UV lamp employed emitted UV radiation having a predominant wavelength of 253.7 nm corresponding to the resonance line of mercury and provided an illuminance of 8 $\mu W/cm^2$ as measured at a 1-meter distance. Water was circulated continuously at a rate per hour of half to eight times the volume of water in the water tank. The amount of suspended chlorophyceae decreased gradually, and one week later, the water became clear. After about one month, almost all chlorophyceae separated from the wall surfaces, and those remaining on part of the walls could be wiped clean simply by brushing. With continuous exposure of circulating water to UV radiation, the water remained clear. There was no regrowth of chlorophyceae. When the illuminance was reduced to 2 $\mu W/cm^2$ at one meter, chlorophyceae grew again after a few weeks. With the illuminance of the same dose of 8 μW/cm², water was circulated at a rate that completed one circulation of the tank capacity in three hours. About seven days later, the water became foul and algae began to grow. This experiment shows that for inhibition and elimination of chlorophyceae, the wavelength and dose of UV radiation and the rate of water circulation must be held above a certain level. Particularly good results were obtained when the hourly water circulation rate was from two to eight times the volume of water in the water tank.

The method of this invention was also applied to a 50-liter glass tank wherein 40 small-size tropical freshwater fish were kept. The UV lamp employed emitted UV radiation having a predominant wavelength of 253.7 nm and provided an illuminance of 4 to 20 μW/cm² at a one-meter distance. Water was circulated from two to eight times the volume of water in the reservoir. In the test, no chlorophyceae came into existence, water was kept clear, and the fish grew normally. This condition could be retained for 3 to 4 years or more without any replacement of water.

Treatment of seawater was also conducted with a 50-liter glass water tank containing ten seawater fish. The UV lamp used emitted UV radiation having a predominant wavelength of 253.7 nm and provided an illuminance of at least 4 μW/cm² (1 m). The hourly water circulation rate was from two to ten times the volume of water in the water tank. The treated water remained clear for almost two years without giving life to any chlorophyceae, and the fish grew well.

Figure 3:
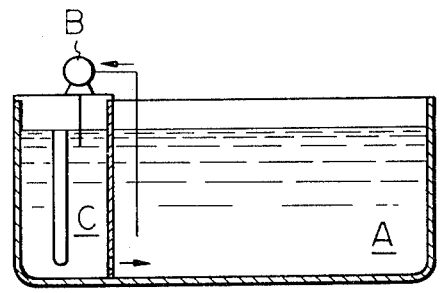
FIG. 3 is another embodiment of this invention.

In the embodiment illustrated above, the UV irradiation vessel is installed outside of the water tank. It is to be understood that a modification of the embodiment is possible wherein part of the water tank is reserved for a UV irradiation vessel as shown in FIG. 3. Alternatively, part of the piping midway within the water circulating path may be replaced by such an UV irradiation vessel.

When the illuminance of the UV lamp used in the above purification of fresh water was gradually decreased, the condition of the treated water in the water tank changed as shown in the Table below. As the Table indicates, when the illuminance was less than 2 μW/cm² (1 m) for a 50-liter water tank, chlorophyceae grew and the COD level exceeded 4 ppm.

TABLE

| Illuminance of UV radiation at 1 m (μW/cm²) | Dose of UV radiation at one pass (μW . min/cm²) | Dose of UV radiation in 1-hr. circulation (μW . min/cm²) | COD (ppm) | Chlorophyceae |
| --- | --- | --- | --- | --- |
| 20 | 1700–6700 | 13400 | <1 | non-existent |
| 14 | 1200–4700 | 9400 | <1 | non-existent |
| 8 | 680–2680 | 5370 | <1 | non-existent |
| 2 | 170–671 | 1340 | <1 | non-existent |
| 1.5 | 128–503 | 1000 | <4 | came to life and killing impossible |

The dose of UV radiation to which the water in the UV irradiation vessel used in the method of this invention is exposed is now described. Generally, the dose of radiation is in inverse proportion to the square of the distance from a light source, and the dose of UV radiation to which a given volume of water in the water tank is exposed at one pass through an UV irradiation vessel can be represented by the following formula:

$$P = \left(\frac{100}{r}\right)^2 \times W \times \frac{V_1}{A} \quad (\mu W \cdot \min/cm^2) \tag{1}$$

wherein r = the inside diameter of the UV irradiation vessel;
$V_1$ = the volume of the UV irradiation vessel;
W = the illuminance of UV measured at a one-meter distance from the light source; and
A = the water circulation rate (l/min).

In the experiment described above, r = 3.86 cm, $V_1$ = 0.85l, and W = 8 μW/cm². Since the volume of water running through the piping and UV irradiation vessel is much smaller than the volume of the water tank ($V_0$ = 50l), it can be safely disregarded in calculating the water circulation rate as follows:

Circulation rate for two circulations per hour $$A_1 = \frac{2V_0}{60} = 1.7 \ (l/\min)$$

Circulation rate for eight cycles per hour $$A_2 = \frac{8V_0}{60} = 6.7 \ (l/\min)$$

The doses of UV radiation to which water in the tank circulating at the rates $A_1$ and $A_2$ is exposed upon one pass through the irradiation vessel are written as $P_1$ and $P_2$, and they are calculated from formula (1) as follows:

$$P_1 = \left(\frac{100}{3.86}\right)^2 \times 8 \times \frac{0.85}{1.7} = 2684.6 \ (\mu W \cdot \min/cm^2)$$

$$P_2 = \left(\frac{100}{3.86}\right)^2 \times 8 \times \frac{0.85}{6.7} \ 681.2 \ (\mu W \cdot \min/cm^2)$$

It is generally considered that about 650 to 6600 μW.min/cm² of UV radiation is required to kill 99.9% of fungal spores which are more resistant to UV radiation than bacteria. Since algae are higher organisms than fungi, more UV radiation seems necessary to kill them. This will be understood from the fact that the direct rays of the sun kill bacteria and fungi whereas algae grow well and proliferate on exposure to the sun. An ultraviolet bactericidal lamp per se is not affected by moisture, but bacteria and fungal spores which are supposed to be killed by the lamp get more resistant in the presence of moisture. On the other hand, UV radiation is more attenuated in water than in air. Therefore, it is generally considered that the required dose of UV radiation in water to kill fungal spores is at least 6500 to 66,000 μW.min/cm² which is ten times as much as the required dose in air.

From the above facts and the results of our experiments, it has been found that one circulation of water is not sufficient to kill all chlorophyceae present on exposure to 681.2 to 2684.6 μW.min/cm² of UV radiation at one pass. According to our observation, the intended object can be achieved by repeating water circulation at such a rate that at least half of the volume of water in the water tank is circulated per hour on the condition that UV radiation has a predominant wavelength of 253.7 nm and that either a given volume of water be exposed to at least 170 μW.min/cm² of UV radiation at one pass through the irradiation vessel or it be exposed to a total of at least 1000 μW.min/cm² of UV radiation during a one-hour circulation. Presumably, exposing a continuous supply of water which contains suspended spores of chlorophyceae to the UV irradiation vessel inhibits the growth of the chlorophyceae.

Therefore, in the method of this invention, a UV lamp in the water circulating path is not sufficient to achieve satisfactory control of algal growth. Three other factors, i.e. the wavelength of UV radiation, its dose, and water circulation frequency, must be specified. Only by satisfying these conditions can this invention achieve one of its objects, i.e. destruction of the function of chlorophyceae to proliferate.

Predominant wavelength of UV radiation: less than 280 nm

Dose of UV radiation: a given volume of water is exposed to a dose of at least 170 μW.min/cm² at one pass through the irradiation vessel or is exposed to a total dose of at least 1000 μW.min/cm² during a one-hour circulation Water circulation rate: at least half of the volume of water in the water tank is circulated per hour, with the above conditions satisfied UV irradiation may be performed continuously or intermittently. For intermittent UV irradiation, a possible deficiency in the total dose must be compensated for by an increased illuminance of a UV lamp or an increased water circulation rate.

If the method of this invention is applied to a water tank, birth and growth of chlorophyceae in water is not only inhibited but growth of chlorophyceae on the walls which are not directly irradiated with UV rays is also inhibited. If the method is applied to a water tank already infested with chlorophyceae, with growth of the chlorophyceae is retarded and the algae themselves can even be eliminated.

The water purified by the method of this invention is not toxic to humans, animals and fishes. The method will therefore prove very useful in the maintenance of fish tanks that must contain clear and clean water. It is capable of keeping the water clear for many years without causing any adverse effect on aquatic animals such as fish. The method is also effective in purifying water in storage tanks for buildings or water in swimming pools. Therefore, this invention provides a very useful means for achieving complete inhibition and elimination of chlorophyceae which has been considered impossible with the conventional technique.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of inhibiting and eliminating chlorophyceae in water in a tank which comprises:

circulating said water through an ultraviolet irradiation vessel equipped with a short-wave ultraviolet lamp at such a rate that at least half of the volume of water in said tank is circulated per hour and that a given volume of water is exposed to at least 170 μW.min/cm² of ultra-violet radiation at one pass through said irradiation vessel such that said ultraviolet exposure is insufficient to kill a substantial portion of said chlorophyceae in said one pass and without having a detrimental affect on higher aquatic life forms;

exposing said water to a chlorophyceae inhibiting and eliminating agent consisting essentially of ultraviolet radiation, having a predominant wavelength of 253.7 nm, and returning said water to said water tank.

2. A method of inhibiting and eliminating chlorophyceae in water in tank which comprises:

circulating said water through an ultra-violet irradiation vessel equipped with a short-wave ultraviolet lamp at such a rate that at least half of the volume of water in said tank is circulated per hour and exposing a given volume of water to a total of at least 1000 μW.min/cm² of ultra-violet radiation during a one-hour circulation such that said ultraviolet exposure is insufficient to kill a substantial portion of said chlorophyceae in said one pass and without having a detrimental affect on higher aquatic life forms;

exposing said water to a chlorophyceae inhibiting and eliminating agent consisting essentially of ultraviolet radiation having a predominant wavelength of 253.7 nm; and returning said water to said water tank.

3. A method according to claims 1 or 2 which further comprises circulating at least twice the volume of water in the tank per hour.

* * * * *